Patented Dec. 25, 1945

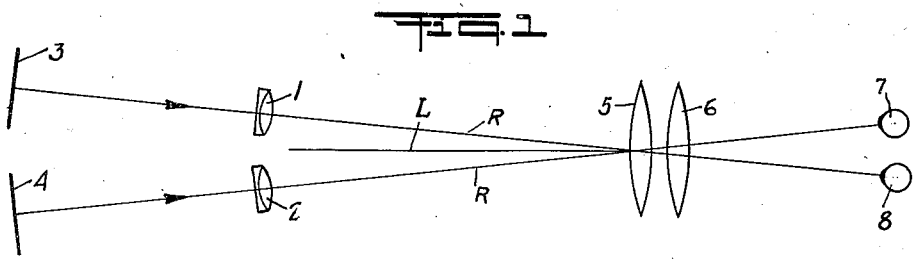
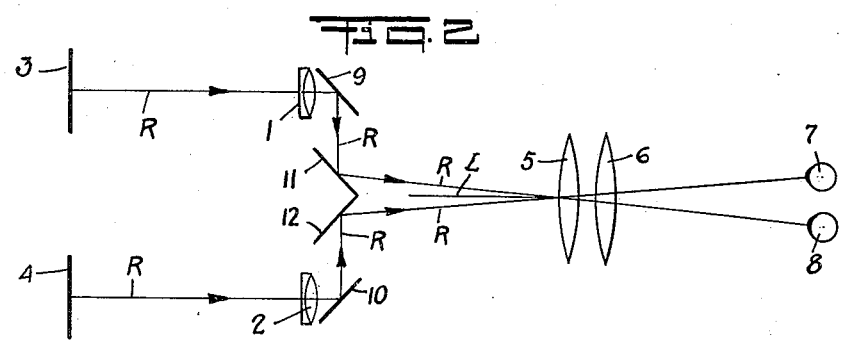
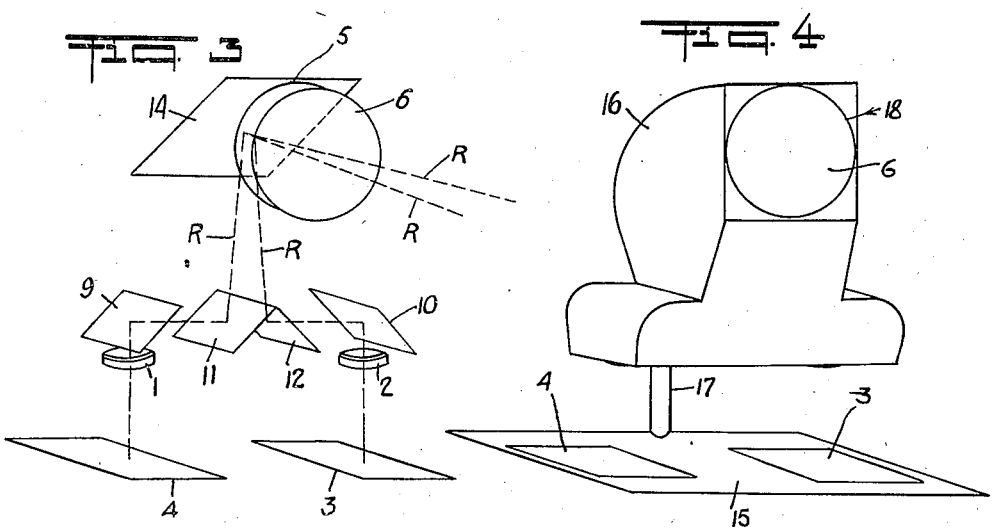
INVENTOR.
Leo H. Brown
BY Mock & Blum
ATTORNEYS

2,391,675

UNITED STATES PATENT OFFICE 2,391,675

STEREOSCOPE

Leo H. Brown, New York, N. Y.

Application February 11, 1943, Serial No. 475,479

2 Claims. (Cl. 88—29)

My invention relates to a new and improved stereoscope.

According to my invention, the stereoscope is provided with a single eyepiece lens or eyepiece lens combination, which is sufficiently large so that the observer can view the two pictures simultaneously and equally with both eyes through a single large eyepiece lens or through a single eyepiece lens combination. Likewise, the observer can move his head back and forth relative to said large eyepiece element, through a substantial distance, while securing a clear field of view simultaneously with both eyes, through a single eyepiece. These factors greatly increase the ease of use of the improved device, as compared with the standard device, in which each eye of the observer must be held accurately in relation to a single respective lens or mirror.

Other objects of the invention are set forth in the annexed description and drawing, which illustrate preferred embodiments thereof.

Fig. 1 is a diagrammatic view of the optical system of one embodiment.

Figs. 2 and 3 are diagrammatic views of additional embodiments.

Fig. 4 illustrates how the stereoscope can be located in a housing, for use at a desk or the like.

Fig. 1 shows the left-eye picture 3, the right-eye picture 4, the respective objective lenses 1 and 2, the eyepiece lenses 5 and 6, the station 7 of the right eye, and the station 8 of the left eye. The lines R indicate the direction of the rays of light from the pictures 3 and 4.

As a practical example, and without limiting the invention thereto, each of the identical objective lenses 1 and 2 is an achromatic lens whose focal length is six inches, and whose diameter is two inches. Each of the identical lenses 5 and 6 of the eyepiece combination has a focal length of twelve inches and a diameter of six inches. Each lens 5 and 6 is a simple convex lens. There is an optical separation of sixteen inches between the objective lenses 1 and 2, and the eyepiece combination 5—6. This provides a magnification of the pictures of two times or diameters. The eyes of the observer can be moved between 9–14 inches from the eyepiece combination, while observing the full field of view simultaneously with both eyes.

The best results are secured when the distance between the pictures 3 and 4, and the objective lenses 1 and 2, is such that the objective lenses 1 and 2 form an image about one inch to the left of the inner eyepiece lens 5. This is not critical, because the eyes of the observer can accommodate themselves for various points of focusing.

The distance between each picture 3 and 4 and the respective objective lens, is then about nine inches.

By varying the optical distance between the objective lenses and the eyepiece combination, the magnification of the pictures can be continuously varied from a magnification of one diameter to four diameters. In order to focus a variable power stereoscope, the pictures can be moved back and forth relative to the objective lenses, or the entire stereoscope can be moved relative to the pictures.

A change in magnification is secured by varying the distance between the objective lenses and the eyepiece combination. In the embodiment shown in Figs. 3 and 4, the objective lenses can be mounted so that said objective lenses can be moved up and down independently of the other parts of the instrument, in order to vary the magnification.

Fig. 2 shows the use of planar mirrors 9, 10, 11, 12, so that the separation between the pictures can be increased. Fig. 3, like Fig. 2, shows the pictures 3 and 4 located in the same horizontal plane, which may be the plane of the top of a desk or the like. Fig. 3 also shows an additional large mirror 14 located behind the eyepiece lenses 5 and 6, so that the light is reflected through the eye-piece lenses 5 and 6 to the eyes of the observer.

Fig. 4 shows the apparatus of Fig. 3 mounted in a housing 16, which is provided with an opening or window 18, in which the outer eyepiece lens 6 is located. The pictures 3 and 4 are located horizontally on a platform 15 which may be the top of a desk or the like.

In the embodiment of Fig. 4, the focusing can be secured by making the platform 15 vertically adjustable, or by vertically adjusting the housing 16 on the vertical supporting post 17. In such case, the movement is in a direction which corresponds to the bisecting line L of Figs. 1 and 2.

It is thus possible for an observer who is seated at a desk, to make the necessary adjustments while securing a full and clear field of view with both eyes through a single eyepiece.

The two eyepiece lenses 5 and 6 can be replaced by a single equivalent eyepiece lens.

Hence, whenever I refer to an eyepiece in a claim, I include the use of one or more eyepiece lenses. The invention can be used for viewing two stereoscopic pictures. Numerous changes and omissions and additions can be made without departing from the scope of the invention.

I claim:

1. A stereoscope which comprises a support which supports the stereoscopic pictures in a common plane, a housing which has an opening, said housing and said support being adjustable relative to each other in a direction which is perpendicular to said common plane, an eyepiece located in said opening, an opening-reflector carried in said housing inwardly of said eye piece, said opening-reflector being shaped and located to reflect the incident rays which fall on said opening-reflector so that the reflected rays are transmitted through said eye piece and said opening, respective objective-lenses carried by said housing, each objective-lens being adapted to form a real image of a respective stereoscopic picture, respective objective-lens mirrors carried by said housing and associated respectively with the respective objective-lenses, each said objective-lens mirror being located inwardly of the respective objective-lens, additional reflecting means carried in said housing, said additional reflecting means being located and shaped to reflect the light which is reflected from said objective-lens mirrors to said opening-reflector, said eyepiece being sufficiently large to permit the respective pictures to be simultaneously viewed by the light which is transmitted through said eye-piece at a station which is spaced from said eyepiece.

2. A stereoscope for viewing two planar pictures which are located substantially in the same plane, said stereoscope comprising respective objective lenses which are associated respectively with said pictures to form respective magnified images of said pictures, an objective-lens mirror associated with each said objective lens, each said objective lens mirror succeeding the respective objective lens, said objective lens mirrors being inclined to reflect towards each other the light which is transmitted through said objective lenses, additional reflecting means which succeed said objective-lens mirrors and which are located intermediate said objective-lens mirrors, an eyepiece mirror which succeeds said additional reflecting means, said additional reflecting means being located and positioned to reflect the respective incident beams which are reflected from said objective-lens mirrors to said eye-piece mirror as converging beams, eye-piece lens means which succeed said eye-piece mirror, said additional reflecting means and said eye-piece mirror being located to reflect the light which is transmitted through said objective lenses, through said eye-piece lens-means in a path which is substantially parallel to said plane, said eye-piece lens means being sufficiently large to permit both eyes of the observer simultaneously to view both said pictures, the converging beams which are reflected from said eye-piece mirror through said objective-lens means being thus reflected in diverging paths.

LEO H. BROWN.